April 2, 1963

E. F. DOSIE 3,083,524

FILTER FOR THE EXHAUST GASES OF INTERNAL
COMBUSTION ENGINES AND THE LIKE

Filed Aug. 18, 1960

INVENTOR.
ERWIN F. DOSIE

BY
Wright Wright
ATTORNEYS

April 2, 1963  E. F. DOSIE  3,083,524
FILTER FOR THE EXHAUST GASES OF INTERNAL
COMBUSTION ENGINES AND THE LIKE
Filed Aug. 18, 1960  2 Sheets-Sheet 2

INVENTOR.
ERWIN F. DOSIE
BY
Wright and Wright
ATTORNEYS

United States Patent Office 3,083,524
Patented Apr. 2, 1963

3,083,524
FILTER FOR THE EXHAUST GASES OF INTERNAL COMBUSTION ENGINES AND THE LIKE
Erwin F. Dosie, Milwaukee, Wis., assignor of one-half to Lillian P. Dosie, Milwaukee, Wis.
Filed Aug. 18, 1960, Ser. No. 50,502
9 Claims. (Cl. 60—29)

This invention relates to the removal of objectionable matter from gases prior to the entrance thereof into the atmosphere and more particularly to the removal of carbon and other deleterious material from the exhaust gases of internal and like combustion engines and is a further development in the art of gas purification over the device shown in my prior application for patent entitled "Exhaust Filtering and After Burner, Carbon and Alkali Sludge Removal Units," filed Jan. 11, 1960, Serial No. 1654, now Patent No. 3,032,967.

In my mentioned application, the problem confronting designers of mufflers and the like embodying means for the purification of exhaust gases has been set forth and my present invention has for its primary object the provision of novel means for leading exhaust gases simultaneously into the opposite ends of a filtering and sump unit for effectively balancing pressure in the unit and for insuring the effective use of the filtering material in the unit throughout the entire area thereof.

Another salient object of my invention is to provide a filtering and sump unit embodying a casing formed from a casting of aluminum for insuring the quick dissipation of heat of the gases from the interior to the exterior of the casing, means being provided for utilizing the heat for the warming of the engine and the interior of automobile bodies.

A further object of my invention is the provision of a novel foraminous basket or cage detachably fitted within the casting for receiving and confining the filtering material, so that when the filtering material becomes loaded with carbon and the like, the entire cage with the filtering material can be quickly removed from the casting for the cleaning or replenishing of the filtering material.

Another further object of my invention is the provision of means for forming the casing and cage, whereby the filtering material can be flushed out for cleaning purposes without the necessity of removing the cage and filtering material from the casing.

A further important object of my invention is the provision of metal guard members arranged in the casting at the inlet openings or ports for the exhaust to prevent the initial, hot impact of the exhaust gases against the aluminum casting.

A still further object of my invention is the provision of means of a conduit or chamber extending the full length of the casting at the bottom thereof for receiving the filtered gases and having associated therewith additional means to act as a heat transfer and to warm additional fresh air for the heating of an engine or automobile body.

A still further object of my invention is the provision of an after burner associated with the longitudinal conduit for burning any remaining volatile gases in the filtered exhaust, whereby to further purify the gases prior to the entrance thereof into the atmosphere.

A still further important object is the provision of means for cooling any burned gases in the after burner with means for admitting fresh air into the gas stream so that the stream as it enters the atmosphere will be substantially at a tempertaure commensurate with the temperature of the atmosphere.

A still further object of the invention is the provision of means for utilizing water spray elements in the conduit for settling any sludge that might remain in the filtered gases.

Another further important object of my invention is the provision of a novel means for utilizing a heated air for warming the engine and for insuring the proper circulation of the air during the summer and winter seasons.

With these and other objects in view, the invention consists in the novel construction, arrangement and formation of parts, as will be hereinafter more specifically described and claimed, and illustrated in the accompanying drawings, in which drawings, FIGURE 1 is a longitudinal sectional view through my filtering unit, the lower portion of the view illustrating the longitudinally extending conduit;

Figure 2:
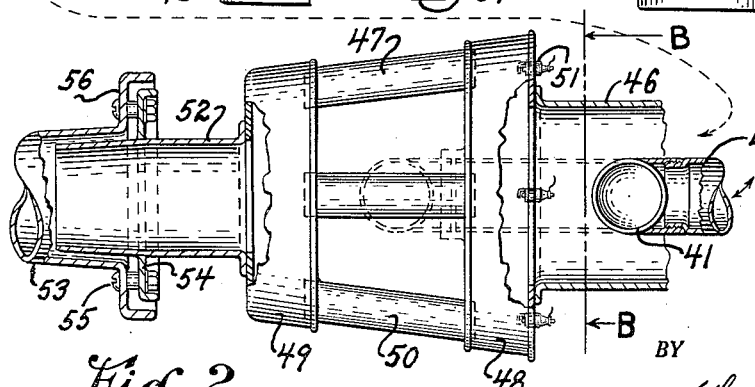
FIGURE 2 is a fragmentary top plan view partly in section, showing a continuation of a part of the longitudinally extending conduit, the view illustrating more particularly the after burner and cooling means for burned gases.
Figure 5:
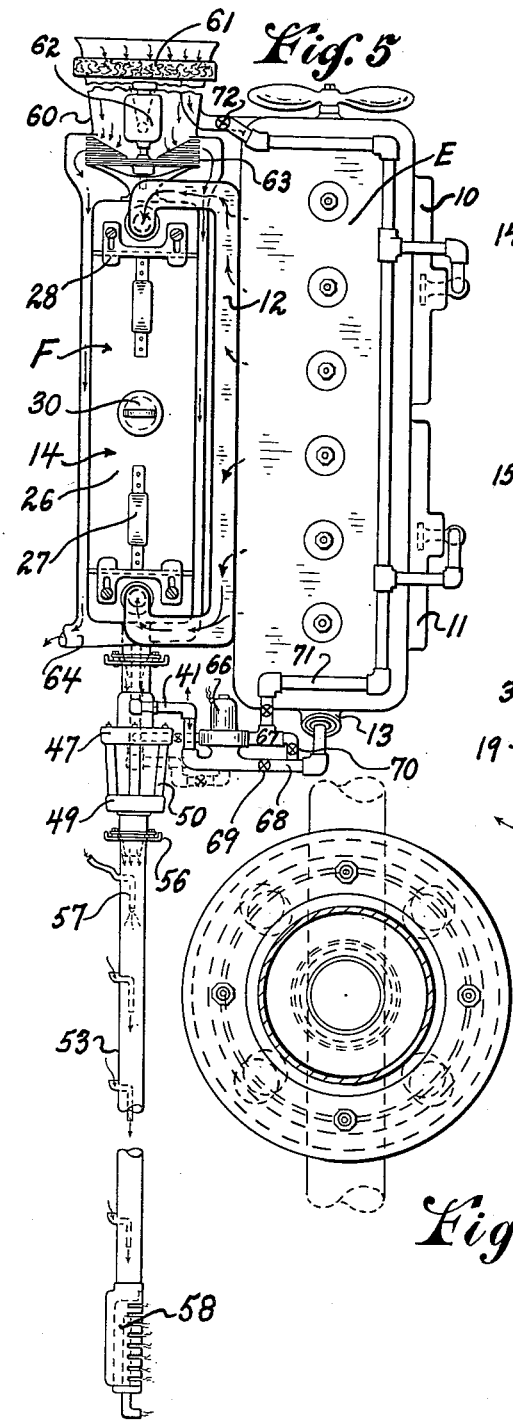
Figure 4:

FIGURE 4 is a transverse sectional view through the longitudinal conduit taken on the line B—B of FIGURE 2, looking in the direction of the arrows, the after burner being shown in end elevation, and FIGURE 5 is a top plan view showing my novel filtering and cleaning unit installed on an internal combustion engine, the view also illustrating the means employed for insuring the proper draft of pure, warm air to the engine, the view also showing substantially complete the longitudinally extending conduit.

Referring now to the drawings in detail, wherein similar reference characters designate corresponding parts throughout the several views, the letter F generally indicates my novel filtering and cleaning device installed on an internal combustion engine E.

The internal combustion engine E can be of any desired type and character and for the sake of simplicity the same has been shown to be a six cylinder engine, with the cylinders in line. The engine is provided with the intake manifolds 10 and 11 and an exhaust manifold 12. In accordance with my invention, I lead from the oil pan or crankcase a fitting 13 for a purpose which will later appear.

Figure 1:
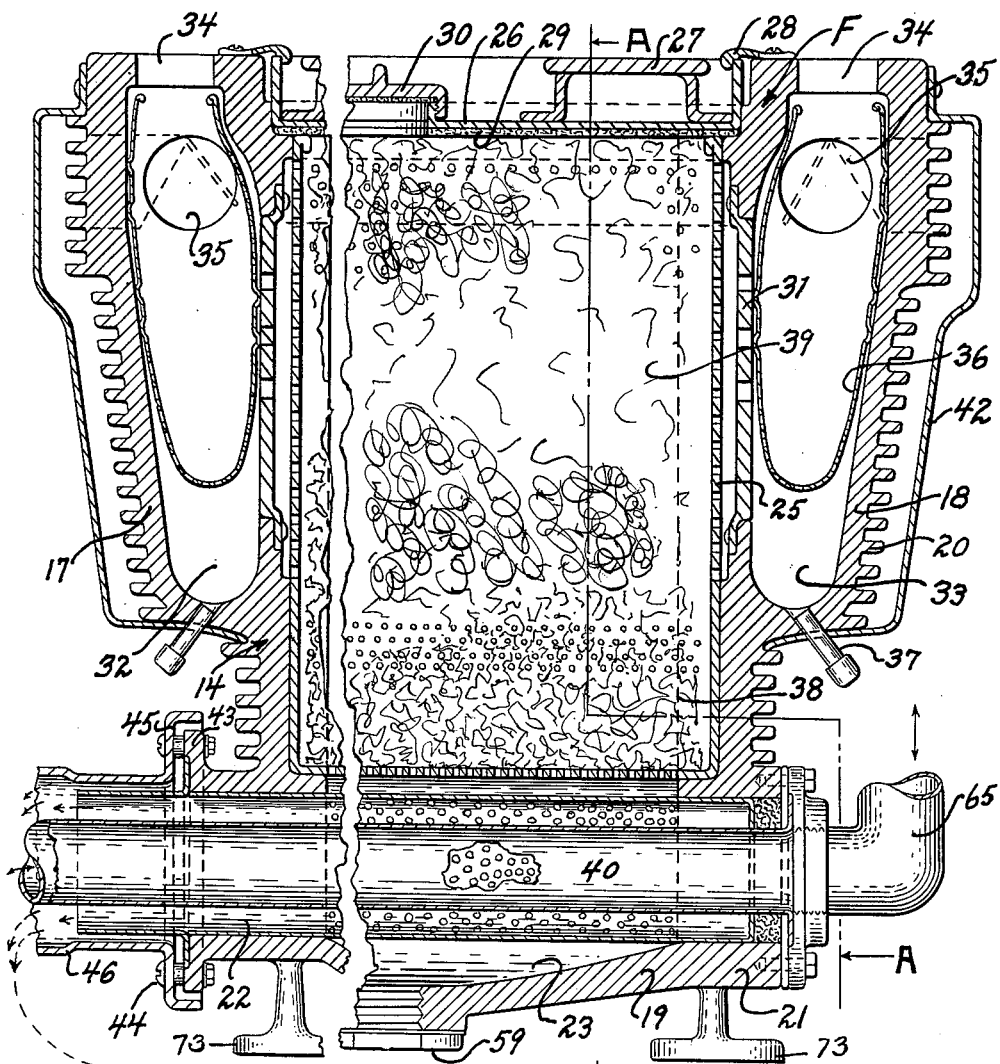

The filtering and cleaning unit F comprises a longitudinally extending casing 14 preferably formed from a casting of thick aluminum. This casing includes side walls 15 and 16, end walls 17 and 18 and a bottom wall 19. The side walls, end walls and bottom wall are provided with exteriorly extending heat dissipating fins 20. The bottom wall 19 is curved transversely to provide a housing 21 for a longitudinally extending cylindrical conduit or muffling sleeve 22. As best shown in FIGURE 1, the extreme lower portion of the bottom wall 21 extends down below the cylindrical conduit 22 to provide a sump or basin 23, the purpose of which will also later appear. Substantially at the points of juncture of the curved bottom wall 21 with the side walls 15 and 16, the casing is provided with longitudinally extending stop shoulders or seats 24 for a removable foraminous basket or cage 25 which fits into the casing. This removable cage or basket 25 is fitted in the casing through the top thereof and the open top of the casing is normally closed by a removable cover 26. The cover 26 is provided with manipulating or pull handles 27 and the cover is detachably held in place by clamps or clips 28. A gasket 29 is preferably interposed between the cover and the walls of the casing in order to provide a leakproof connection to prevent the escape of obnoxious gases from the casing. The cover is also provided with a removable wash-out plug 30, the purpose of which will also be more clearly described.

The end walls 17 and 18 are preferably bulged outwardly beyond the ends of the removable basket or cage 25 and these end walls 17 and 18 are separated from the cage by removable perforated plates 31. The plates 31 in conjunction with the end walls 17 and 18 and parts of the side walls form entrance chambers 32 and 33 for the exhaust and also function as initial sumps or basins for solid particles of matter.

The exhaust entrance chambers 32 and 33 adjacent to their upper ends are provided respectively with top inlet ports 34 and side inlet ports 35. Either the top ports 34 or side ports 35 are utilized according to the type of engine with which the device is associated and if the top ports 34 are utilized, then the side ports 35 are closed by plugs, not shown, and vice versa.

In order to prevent initial impact of the gases against the aluminum casting, I preferably employ U-shaped resilient guard plates 36 preferably formed of stainless steel and these guard plates 36 are compressed and inserted into the chambers 32 and 33 through the top ports 34. As the guard plates are compressed and forced through the ports into the chambers the same expand and frictionally grip the walls of the chambers.

The incoming exhaust impinges against the guard plates and flows through the perforations therein and some solid matter will drop to the bottom of the chambers 32 and 33. These chambers can be flushed out through the ports 34 and 35 and the lower ends of the chambers are provided with capped drain pipes 37.

As intimated, the cage or foraminous basket 25 is packed with a desired type of filtering material and I preferably use a certain, specific type of filtering material. The bottom of the basket is packed with Fiberglas, indicated by the reference character 38 and above the Fiberglas, the basket or cage is packed with bronze metal shavings or spiral curls 39. At this time, it is to be noted that the side and end walls of the basket are perforated and constitute inlets for the exhaust gases and that the bottom wall of the cage or basket is perforated and constitutes outlets for the filtered gases entering directly from the casing and cage into the conduit 22.

The entire areas of the openings in the plates 31 are considerably greater than the cross-sectional area of the exhaust pipes leading into the casing or ports 34 and hence, free exit of the gases from the chambers 32 and 33 into the cage is permitted. The entire areas of the openings in the side walls of the cage are also considerably greater than the area of the inlet ports 34, and consequently, the unimpeded free flow of gases into the cage is permitted. This is also true of the entire area of the openings in the bottom wall of the cage or basket and hence, the unimpeded flow to the conduit 22 is insured.

While any desired type of packing can be used in the cage, again, I prefer to use Fiberglas 38 and the bronze spiral curls 39. In actual practice, the bronze spiral curls not only provide a filtering medium but also act as a catalyst so as to insure the retention of solid particles in the exhaust by the cage.

The conduit 22 is perforated so that the filtered gases will have free entrance into the same and as these openings are numerous in number, the entire area thereof will be considerably greater than the area of the ports 34 and hence the free flow of gases into the conduit is insured. The conduit also acts as a baffle to decrease noise and to also act as means for bringing about the precipitation of solid particles in the sump 23. At this time, it is to be noted that a pipe 40 for fresh air extends through the conduit and exits at a distance beyond the casing, as at 41. The purpose of this fresh air conducting pipe 40 will later appear, but it is to be noted that a heat transfer will take place so as to bring about the additional cooling of the filtered gases. Likewise, the casing itself is jacketed, as at 42, to provide chambers for fresh filtered air, as will later appear and the air in the jacket tends to cool the walls of the casing and this heated air is then used for a specific purpose, as will also later appear.

The rear end of the bottom wall 21 of the casing terminates in a flanged nipple or coupling 43. Secured to the flanged coupling by bolts 44 is the flanged end 45 of a longitudinally extending conduit 46. This conduit 46 in fact is a continuation of the conduit 40 and the conduit 40 exits into the conduit 46. As conduit 40 extends into the conduit 46, a suction action is brought about and this is utilized for bringing fresh air for cooling purposes into the conduit 46. The bolts 44 are provided with spacers so that the flanged end 45 of the conduit 46 is spaced from the flanged end 43 of the nipple or coupling formed on the casing and this spacing permits the intake of fresh cooling air.

Conduit 46 leads to and communicates with an after burner 47. This after burner includes front and rear hollow drums 48 and 49 coupled together by spaced pipes 50. The front drum 48 is provided with a series of spark plugs 51 which are fired in any preferred manner by closing a circuit through the metal shells of the plug and central electrodes. Thus, any remaining volatile gases in the filtered exhaust will be fired by the plugs and as these fired gases flow through the pipes 50 and drum 49 the same will be cooled. In order to further aid in the cooling thereof, the rear drum 49 has communicating therewith an outlet pipe 52 and this outlet pipe 52 extends into a continuing longitudinally extending conduit 53. The pipe 52 carries a radially extending flange 54, which is connected by bolts 55 with the flanged end 56 of the conduit 53. Spacers are utilized on the bolts to separate the flanges 54 and 56 so that fresh air can be sucked into the conduit 53 and thus insure further cooling of the fired gas, as heretofore mentioned.

If there should be any remaining sludge or solid matter in the filtered gases, this can be precipitated in the conduit 53 by the use of spaced water spray nozzles 57. Water can be injected into the nozzles in any preferred way.

While the gases, through their passage through the casing and various pipes and conduits will be silenced, I can use any preferred type of silencer 58 at the terminal of the conduit 53.

From the description so far, it can be seen that a simple and novel means has been provided for not only insuring the proper filtering of exhaust gases, but for also effectively reducing the temperature thereof and to prevent the entrance of the hot gases into the atmosphere, in noise making pulsations.

Figure 3:
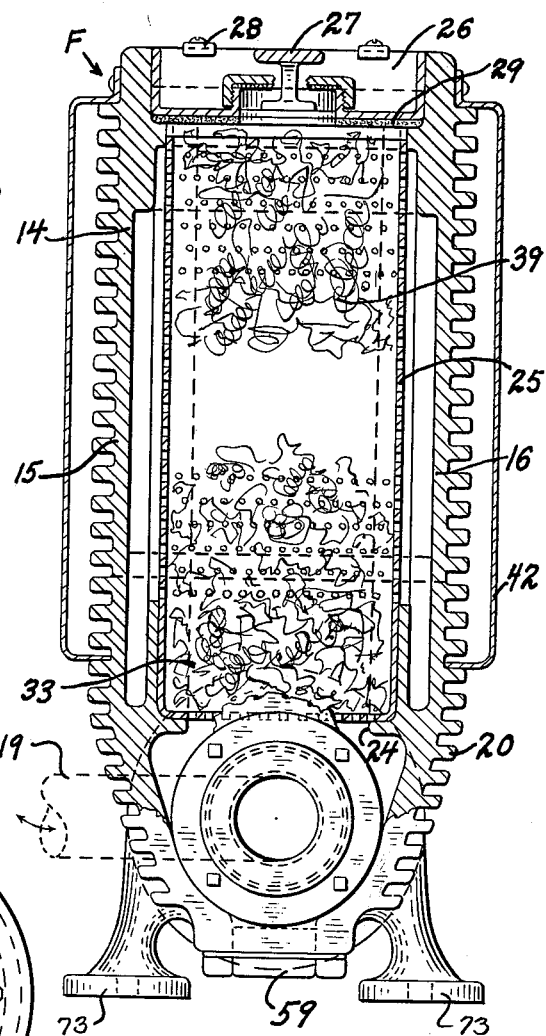
FIGURE 3 is a transverse sectional view through my novel filtering unit taken on the line A—A of FIGURE 1, looking in the direction of the arrows.

Again referring to FIGURES 1 and 3, it can be seen that the bottom wall of the casing or the sump is provided with a clean-out plug 59.

As heretofore brought out, the filtering material in the cage or basket 29 can be flushed out by removing the cap 30 and the plug 59, or, as also brought out the cover 26 can be removed in its entirety and the cage or basket with the filtering material withdrawn from the casing.

As also mentioned fresh air is heated by the device, namely, in the jacket 42 and in the pipe 40 and this fresh heated air can be used for warming the engine or interior of an automobile body.

By referring to FIGURE 5 of the drawing it can be seen that I prefer to provide a large inlet mouth 60 for fresh air and this mouth can have interposed therein any preferred type of filter 61 for the fresh air. To insure the drawing in of the fresh air and forcing of the air through the jacket 42, I provide an electric motor 62 having secured to its armature shaft an air impeller 63. Thus, fresh filtered air is forced through the jacket and this air can be expelled through an outlet 64 and this pipe could lead to the interior of an automobile body.

The inlet for the pipe 40, as shown at 65, in FIGURE 1, can lead to the mouth 60 if such should be preferred. However, the exit 41 for the pipe 40 leads to a motor driven impeller 66 which functions to draw fresh air through pipe 40 and 41 and to expel the same into a T-coupling 67. The inlet of the impeller can also have connection through a pipe 68 with the crankcase through the coupling 13 and this pipe 68 is provided with a valve 69. The coupling 67 can have communication through a valve pipe 70 with the pipe 18 and the coupling 67 also has connected therewith through the medium of a valve pipe 71 with the intake manifolds 10 and 11. At this time, it is to be noted that the pipe 71 can extend along the engine and into the mouth 60. At that point the pipe 71 can also be provided with a valve 72. In warm weather the valve 72 can be opened and the valve in the pipe 71 adjacent the T coupling 67 can be closed and thus fresh cool air can be supplied to the intake manifolds. In winter, the valve 72 can be closed and the valve in the pipe 71 adjacent the coupling 67 can be opened, and the valve 70 closed. Thus, hot oil vapor from the crankcase and heated air will be supplied to the pipe 71 and to the intake manifolds 10 and 11.

The casing 14 can be provided with supporting legs 73 or any other desired type of supporting members or brackets for connection with the chassis of an automobile or other appliance with which the filtering device is associated. If desired the conduit 53 can be split into dual exhausts or conduits as may be desired by an automobile manufacturer.

Changes in details may be made without departing from the spirit or the scope of this invention, but what I claim as new is:

1. A unit for association with the exhaust pipes of an internal combustion engine for removing carbon and other obnoxious gases prior to the entrance of said gases into the atmosphere comprising a casing having a main filtering compartment therein, filtering material in said main compartment, and said casing also having chambers at the opposite sides of the main compartment for initially receiving the exhaust gases, said chambers having communication with the main compartment for leading exhaust gases into the opposite sides of the main compartment for the commingling of the exhaust gases therein and in and through the filtering material, means for leading the exhaust gases into the chambers, said chambers being provided at their lower ends with debris receiving sumps, means including drain plugs for flushing out said chambers, and means communicating with the lower end of the main compartment for receiving filtered gases therefrom and for leading said gases to the atmosphere.

2. A unit for association with the exhaust pipes of an internal combustion engine for removing carbon and other obnoxious gases prior to the entrance of said gases into the atmosphere comprising a casing formed from an aluminum casting, said casing having a central filtering compartment and end chambers communicating with said compartment for initially receiving exhaust gases, filtering material in said main compartment, means for leading exhaust gases into said chambers, means communicating with the lower end of the main compartment for receiving filtered gases therefrom and for leading the gases to the atmosphere, perforated guard plates of a different material than the casing fitted in said chambers against which the exhaust gases initially impinge.

3. A unit for association with the exhaust pipes of an internal combustion engine for removing carbon and other obnoxious gases prior to the entrance of said gases into the atmosphere comprising a casing having a main filtering compartment and end chambers communicating with the opposite ends of the compartment for initially receiving exhaust gases, means for leading exhaust gases into the chambers for movement into the main compartment from the opposite ends thereof, a removable perforated cage fitted in said main compartment having filtering material packed therein, means for securing and sealing the cage with the filtering material in the main compartment and means formed on the lower end of the casing and communicating with the main compartment for receiving filter gases therefrom and for leading said gases to the atmosphere.

4. A unit for association with the exhaust pipes of an internal combustion engine as defined in claim 3, and said filtering material including matted bronze spiral shavings.

5. A unit for association with the exhaust pipes of an internal combustion engine as defined in claim 3, and said filtering material including a bottom packed layer of Fiberglas and an upper mass of bronze matted spiral shavings.

6. A unit for association with the exhaust pipes of an internal combustion engine for removing carbon and other obnoxious matter from said exhaust gases prior to the entrance of said gases into the atmosphere comprising a casing, including a main filtering compartment, side chambers communicating with the opposite ends of the compartment for initially receiving exhaust gases and a bottom chamber communicating with the main compartment and having a bottom sump, filtering material in said main compartment, a removable cover for closing the upper end of the main compartment and for confining the filtering material therein, said cover having a removable cap and said sump having a removable clean-out plug, whereby said main compartment and the filtering material can be flushed out by removing the cap and the clean-out plug and forcing a cleaning agent through the main compartment, and means for leading the filtered gases from the bottom of the chamber to the atmosphere.

7. A unit for association with the exhaust pipes of an internal combustion engine for removing carbon and other obnoxious matter from said exhaust gases prior to the entrance of said gases into the atmosphere comprising a casing having a main central filtering compartment and end chambers communicating therewith for initially receiving exhaust gases, whereby said gases are led to the filtering compartment from the opposite ends thereof, filtering material in said main compartment, and said casing also having a longitudinally extending bottom chamber communicating with the main compartment and for receiving filtered gases therefrom and for leading said gases to the atmosphere, and a fresh air pipe extending through said bottom compartment and sealed therefrom, means for forcing fresh air through said pipe for cooling the bottom compartment and for heating air in said pipe for further use.

8. The combination with an internal combustion engine having a crankcase, an exhaust manifold and intake manifolds, of a unit for association with said engine and for receiving exhaust gases therefrom including an elongated casing having a main filtering compartment and end chambers communicating with the opposite ends thereof, means leading the exhaust gases from the exhaust manifold into said chambers, filtering material in said main compartment, said casing also having a longitudinally extending bottom chamber communicating with the main compartment for receiving filtered gas from the main compartment, a conduit communicating with the bottom chamber for leading filtered gases to the atmosphere, said casing being provided with outwardly extending heat dissipating fins, a jacket surrounding the major portion of the finned part of said casing, a motor driven impeller for circulating fresh filtered air through the jacket, said bottom chamber also having therein a pipe sealed off therefrom for the flow of fresh air therethrough for cooling said bottom chamber, a motor driven impeller for sucking fresh air through said pipe, means connecting the discharge side of said last mentioned impeller with the crankcase, means including the last mentioned impeller for leading fresh filtered air to the intake manifolds, means leading heated air from said pipe to the manifolds and valves for controlling the flow of fresh air to the manifolds and for controlling the flow of fresh heated air to the manifolds.

9. A unit for association with the exhaust pipes of an internal combustion engine as defined in claim 2, said aluminum casting being provided with radially extending heat dissipating fins and a jacket surrounding the major portion of the finned casting, means for leading fresh air into the jacket for cooling said casting, and means for leading the heated air from the jacket to a point for further use.

References Cited in the file of this patent
UNITED STATES PATENTS

| | | |
|---|---|---|
| 1,622,498 | Dunn | Mar. 29, 1927 |
| 1,824,078 | Fischer | Sept. 22, 1931 |
| 2,004,865 | Grison | June 11, 1935 |
| 2,038,567 | Ittner | Apr. 28, 1936 |
| 2,737,260 | Jenison | Mar. 6, 1956 |
| 2,763,982 | Dega | Sept. 25, 1956 |
| 2,772,147 | Bowen et al. | Nov. 27, 1956 |
| 2,795,103 | Jenison | June 11, 1957 |